3,846,087
METHOD OF REDUCING THE VISCOSITY OF CARBON-CONTAINING OILS

Roger M. Dille, La Habra, and Ronald W. Chapman, La Mirada, Calif., assignors to Texaco Inc., New York, N.Y.
No Drawing. Original application Sept. 22, 1971, Ser. No. 840,236, now abandoned. Divided and this application Sept. 22, 1971, Ser. No. 182,825
Int. Cl. C10l 1/32
U.S. Cl. 44—51
3 Claims

ABSTRACT OF THE DISCLOSURE

Mixtures of carbon and various oils such as gas oil, shale oil and diesel fuel have their viscosities reduced by adding thereto enough asphaltic residual oil boiling above 1000° F. to satisfy the oil absorption number of the carbon present. With such addition, mixtures of oils and carbon containing up to 20% of carbon remain pumpable.

---

This is a division of Ser. No. 840,236, filed Sept. 22, 1971, now abandoned.

BACKGROUND OF THE INVENTION

This invention relates to a method of reducing the viscosity of carbon-containing slurries so that these slurries can remain pumpable even when they contain up to 20 weight percent of carbon. Typically, such slurries occur in the removal of carbon produced as a by-product in the production of synthesis gas which is primarily a mixture of hydrogen and carbon monoxide or are formed for use as boiler feed or for putting carbon black into rubber.

With particular reference to the production of synthesis gas, it has been previously pointed out in commonly assigned U.S. Pats. 2,999,741; 3,097,081 and 3,097,082 that some finely divided carbon particles are produced in the form of soot. Usually from 1 to 2% of carbon (based on the feed) is left unconverted to protect the generator refractory from attack by nickel and vanadium (U.S. Pat. 3,097,081). The synthesis gas is quenched in water where most of the water is scrubbed from the gas and taken up by the quench water. Because this carbon has a high surface area only from 1 to 2 weight percent thereof can be incorporated in the water and still maintain a pumpable slurry.

Economic considerations dictate that the carbon be separated from at least a major portion of the water to permit reuse of the water and recovery of the carbon in useful form. A widely used method of separation, based on the high carbon carrying capacity of liquid hydrocarbons as compared with water, consists in transferring the carbon to a hydrocarbon liquid by contacting the carbon-water dispersion with a hydrocarbon liquid. This contact effects a separation of clarified water and a slurry of carbon in oil. The clarified water can be reused in the gas generating process and the slurry of carbon in oil can be used to produce more gas when used as synthesis gas generation feed or as a furnace or boiler fuel.

A preferred embodiment is to add a low boiling hydrocarbon to the carbon water slurry, mix by contactors, Ebaugh mixer, a mixing valve or other suitable device, and to transfer the carbon to the organic phase. The resulting mixture is sent to a phase separating zone such as a decanter. The phases are allowed to separate and clear water is withdrawn for reuse in the process or disposal. The organic layer is withdrawn and mixed with a cheaper oil such as resid or fuel oil, the light organic material distilled from the mixture for reuse and the carbon oil slurry used for the production of more synthesis gas or boiler fuel.

Light liquid hydrocarbons suitable for this use include butane, pentane, hexane, light gasoline, naphtha gas oil and platformate. For generator feed materials, such as bunker fuel, residuum, crude, diesel fuel, gas oil, shale oil, and catalytic cracking unit decanted oil are used. For economical and trouble-free operations, the carbon loadings in the various streams must be able to be varied according to the synthesis gas operation.

Experience has shown that major problems are encountered in maintaining the carbon-oil slurry pumpable when the carbon content thereof exceeds about 4 weight percent in naphtha, gas oil, lube oil, shale oil, decanted oil, gasoline, crudes deficient in +1000° F. boiling material or in hydrocarbon deficient in +1000° F. boiling material. Above this figure, the slurry does not flow and upon heating only becomes more gel-like. Dilution with additional oil does not eliminate the gel but merely thickens it. As a result, those skilled in the art to which this invention relates concluded that it was not possible to pump oil-carbon slurries originating in synthesis gas production if they contained more than about 4 weight percent of carbon.

SUMMARY OF THE INVENTION

The main object of this invention accordingly is to provide means for maintaining pumpable carbon-oil slurries containing up to 20 weight percent of carbon. An equally important object of the invention is to provide a pumpable carbon-oil composition containing 3 to 20 weight percent carbon, 4 to 60 weight percent asphaltic residual oil and the remainder comprising a non-asphaltene hydrocarbon liquid boiling below about 1000° F.

Unexpectedly in accordance with this invention, it has been discovered that addition of a quantity of asphaltic residual oils at least sufficient to satisfy the oil absorption value of the carbon present will maintain in a pumpable state oil carbon slurries containing up to about 20 weight percent carbon Lesser amounts will lower the viscosity until a minimum viscosity is reached at the oil absorption number. Since the asphaltic residual oils are themselves thick and viscous in consistency, it is altogether unobvious and unexpected that addition thereof to an already thick and viscous mixture of carbon-in-oil should render the same gel-free and less viscous.

DETAILED DESCRIPTION OF THE INVENTION

In its preferred embodiment, the claimed invention consists in adding from 5 to 40 weight percent of asphaltic residual oil boiling above about 1000° F. to the oil which is used to contact the carbon-water slurry or to the oil used to transfer carbon from a light hydrocarbon to a heavier fraction. The exact amount of asphaltic residual oil to be added is related to the oil absorption number or surface area of the carbon and hence to the operating conditions of the gas generator in particular the carbon removal conditions since these conditions determine the quantity and type of carbon produced and the carbon loading in the various streams produced.

The oil absorption number is a measure of the amount of oil necessary to wet a particular sample of carbon and indirectly measures its surface area. It is determined by adding small increments of oil to a sample of carbon and mixing with a spatula between each addition until a single coherent ball of paste is formed which does not break down after forming. The procedure for this test is described in detail in ASTM Test D281-31. The standard test specifies alkali-refined linseed oil but the test is of value when used with other oils as well. The numerical oil absorption value represents the number of milliliters of oil added per gram of carbon.

In the practice of the present invention, the use of Bunker fuel oil residuum or fuel oil is preferred. It has been observed that the addition of any amount of asphaltic residual oil to a mixture of carbon and an oil which does not contain asphaltenes (gasoline, kerosene and light crude) will thin the mixture, but for this mixture to lose its gel-forming capacity completely at least enough asphaltic residual oil must be added to reach the oil absorption value. Where crude has been used which contains some asphaltenes, but not enough to equal the oil absorption value, there must be added thereto the extra amount necessary to reach this value. It should be noted that a mixture once so modified can be placed in more asphaltene-free oil without gel formation because the carbon absorption capacity has been satisfied.

To illustrate the successful practice of the method of the invention, carbon from the quench blowdown of a synthesis gas generator was extracted with naphtha from the carbon-water dispersion. The naphtha was transferred to shale fuel oil and distilled off to leave a shale fuel oil-carbon mixture. The percentage by weight of carbon in the mixture was determined conventionally, as was the oil absorption value of the carbon. The approximate Brookfield viscosity of blends containing various weights percent of carbon then was determined with a viscosimeter. Next various amounts of Bunker fuel oil were added to the mixture and the viscosities of the thus modified mixture was determined in the same manner. For purposes of comparison, the viscosities of pure Bunker oil containing corresponding amount of carbon were also determined.

TABLE I

[Approximate Bookfield viscosities, cp. at 210° F., 6 weight percent carbon (MRL 3.0 cc./g. oil absorption number)]

| Blend composition, wt. percent | | Brookfield viscosity, cp. at— | | | |
|---|---|---|---|---|---|
| Bunker | Shale fuel | 20 r.p.m. | 10 r.p.m. | 4 r.p.m. | 2 r.p.m |
| 100 | 0 | 560 | 720 | 1,200 | 1,800 |
| 2 | 98 | | Too thick | | |
| 4 | 96 | | 9,800 | 22,000 | 42,000 |
| 6 | 94 | 3,250 | 5,900 | 13,250 | 26,500 |
| 10 | 90 | 415 | 640 | 1,375 | 2,450 |
| 15 | 85 | 90 | 120 | 175 | 200 |
| 0 | 100 | | Too thick | | |
| 9 weight percent carbon | | | | | |
| 26 | 74 | 600 | 920 | 1,700 | 2,800 |

The data presented in the foregoing table show clearly the beneficial effect obtained with regard to viscosity reduction. In particular, the data show that for an oil absorption value of 3.00 cc./g., addition of 4 weight percent of Bunker oil brings the viscosity down to a pumpable figure while a 2% addition, which is insufficient to satisfy the oil absorption value of the carbon, gives a gel which is too thick. Further additions of Bunker Fuel lowers the viscosity to a very low value near the absorption number. Thus 6% carbon takes 18% of Bunker oil.

TABLE II

[Approximate viscosity of shale fuel-Bunker-carbon mixtures SSU at 210° F. Prepared in Waring blender. MRL carbon (oil absorption 3.0 cc./g.)]

| Blend composition, wt. percent | | Weight percent carbon | | | | | |
|---|---|---|---|---|---|---|---|
| Bunker | Shale fuel | 0 | 2 | 4 | 6 | 9 | 10 |
| 100 | 0 | 150 | 250 | 440 | 913 | | Too viscous. |
| 2 | 98 | 39.5 | 99 | (¹) | (¹) | | Do. |
| 4 | 96 | 40.0 | 98 | ²182 | (¹) | | Do. |
| 6 | 94 | 40.5 | 95 | 144 | (¹) | | Do. |
| 10 | 90 | 41.5 | 100 | 108 | 256 | | Do. |
| 15 | 95 | 42.7 | 100 | 108 | 175 | | Do. |
| 0 | 100 | 41.5 | 135 | (¹) | (³) | | Do. |
| 20 | 80 | | | | | | Do. |
| 26 | 74 | | | | | 615 | |
| 28 | 72 | | | | | | 2,000. |
| 33 | 67 | | | | | | 2,500. |
| 38 | 62 | | | | | 600 | |

¹ Too viscous gel.  ² Gel-like.  ³ Too viscous.

The data of Table II is presented graphically in the accompanying graph showing the minimum in the curves at the oil absorption number. In each curve the point "0" is that at which the oil absorption number is equalled as well as the minimum point.

TABLE III

[Brookfield viscosity cp. 4% carbon (3.0 cc./g. oil absorption number)]

| Blend composition, wt. percent | | | Brookfield viscosity, cp. at— | | | |
|---|---|---|---|---|---|---|
| Bunker | Kerosine | Appearance | 2 r.p.m. | 4 r.p.m. | 10 r.p.m. | 20 r.p.m. |
| 0 | 100 | Thick gel | | Too viscous | | |
| 4 | 96 | Gel-fluid | 4,400 | 3,700 | 1,680 | 920 |
| 7 | 93 | Water thin | 1,500 | 800 | 340 | 200 |
| 12 (Oil absorption number) | 88 | do | 325 | 200 | 90 | 70 |
| 17 | 83 | do | 250 | 175 | 90 | 60 |

The data of Table III show the effect on the viscosity of a kerosine blend and again indicates that enough Bunker fuel must be added to at least equal the oil absorption value of the carbon.

TABLE IV

[Approximate Brookfield viscosities, cp. at 210° F. 4 weight MRL carbon (3.0 cc./g. oil absorption number)]

| Blend composition, wt. percent | | Brookfield viscosity, cp. at— | | | |
|---|---|---|---|---|---|
| Bunker | Shale fuel | 20 r.p.m. | 10 r.p.m. | 4 r.p.m. | 2 r.p.m. |
| 100 | 0 | 260 | 300 | 400 | 800 |
| 2 | 98 | 1,750 | 2,800 | 5,500 | 8,000 |
| 4 | 96 | | 1,000 | 1,700 | 2,500 |
| 6 | 94 | 90 | 130 | 225 | 400 |
| 10 (Oil absorption number) | 90 | 30 | 30 | 37 | 50 |
| 15 (Oil absorption number) | 85 | 30 | 30 | 37 | 50 |
| 0 | 100 | 5,600 | 10,000 | 21,000 | 42,000 |

The data of Table IV show the approximate Brookfield viscosities with 4 weight percent of carbon. Taking the values obtained at 20 r.p.m. it is readily seen that 100% Bunker fuel with 4% carbon has a Brookfield viscosity of 260 and that 100% Shale fuel with 4% carbon has a viscosity of 5600. However, a mixture of 6 weight percent Bunker and 94 weight percent of Shale has a viscosity of only 90.

Naturally, where the asphaltic residual oil used has been cut or diluted with distillate or light liquid hydrocarbons it will be necessary to incorporate a proportionally greater amount of the residual oil in order to provide the necessary quantity of heavy molecular weight asphaltenes.

The exact mechanism whereby the beneficial and unexpected results of the invention are obtained is not known precisely. It is believed however, on the basis of microscopic examination, that the high molecular weight asphaltenes are absorbed by the carbon thus breaking the chain-like colloidal effect of the carbon. Accordingly the method of the invention is applicable to all low boiling materials (kerosene, gas oil, diesel fuel, decanted oil from the fuel catalytic cracking units, deasphalted oil, shale fuel oil and the like) which do not contain a sufficient quantity of asphaltenes.

It will be obvious to those skilled in the art that the method and compositions of the invention find use not only in the production of synthesis gas and carbon recovery but also in boiler feed mixture and for putting carbon black into rubber or other mixtures which require carbon.

What is claimed is:

1. In a method for recovering carbon from a carbon-water dispersion by contacting said dispersion with an oil blend to form a carbon oil slurry, the improvement consisting of using an oil blend of 4 to 60 weight percent of asphaltic residual oil boiling above 1000° F., said amount being sufficient to satisfy the oil absorption number of said carbon and the remainder of said blend comprising a light, liquid, non-asphaltic containing hydrocarbon boiling below about 1000° F., from the group of kerosene, gas oil, diesel fuel, shale fuel oil, deasphalted oil and decanted oil from a fuel catalytic cracking unit whereby the resulting carbon-oil slurry remains pumpable even when containing up to 20 weight percent of carbon.

2. The method of Claim 1 wherein the amount of asphaltic residual oil in said blend is from 4 to 40 weight percent thereof.

3. The method of Claim 1 wherein said asphaltic residual oil is Bunker fuel oil or residuum oil.

References Cited
UNITED STATES PATENTS

| | | | |
|---|---|---|---|
| 1,638,314 | 8/1927 | Barth et al. | 44—51 |
| 2,999,741 | 9/1961 | Dille et al. | 23—209.9 X |
| 3,097,081 | 7/1963 | Eastman et al. | 23—199 X |
| 3,197,305 | 7/1965 | Carlson | 44—51 X |
| 2,943,064 | 6/1960 | Lipkin | 44—51 X |

DANIEL E. WYMAN, Primary Examiner

Y. H. SMITH, Assistant Examiner